Oct. 5, 1965     YOSHIO ICHIKAWA     3,209,435
POSITIVE TEMPERATURE COEFFICIENT BEAD THERMISTOR
Filed Feb. 23, 1962
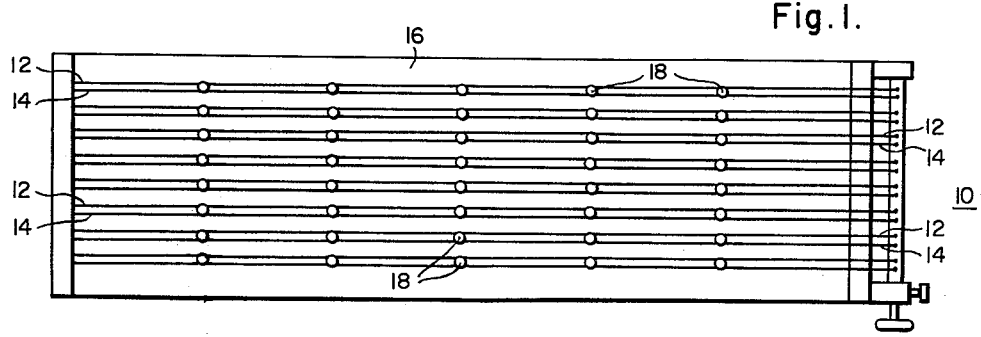
Fig. 1.
Fig. 2A.     Fig. 2B.
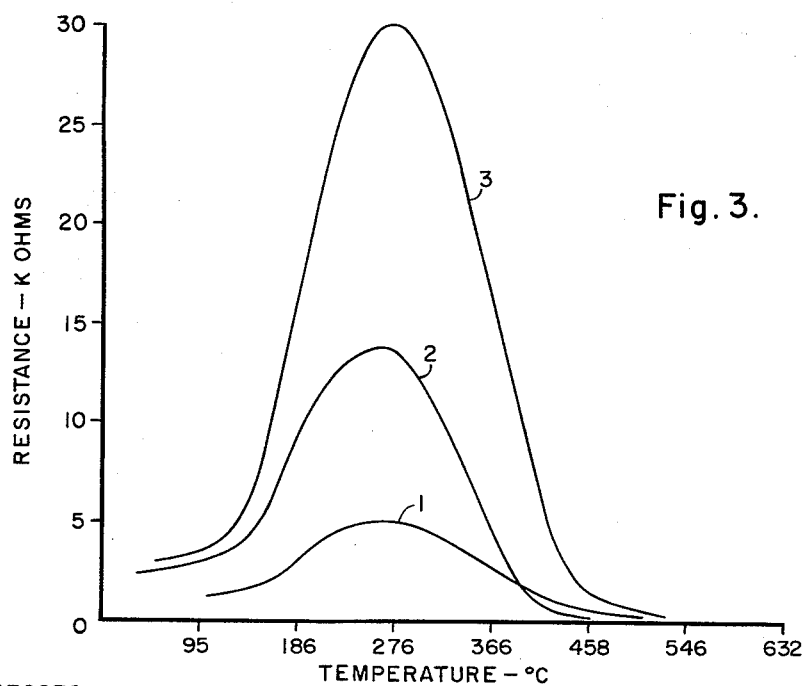
Fig. 3.
WITNESSES
INVENTOR
Yoshio Ichikawa
BY
ATTORNEY 3,209,435
POSITIVE TEMPERATURE COEFFICIENT
BEAD THERMISTOR
Yoshio Ichikawa, Wilkins Township, Allegheny County, Pa., assignor to Westinghouse Electric Corporation, East Pittsburgh, Pa., a corporation of Pennsylvania
Filed Feb. 23, 1962, Ser. No. 175,213
9 Claims. (Cl. 29—155.5)

The present invention relates to a positive temperature coefficient bead thermistor and a method for producing the same.

In my Patents Nos. 2,976,505 and 2,981,699, I have disclosed thermistors which have excellent positive temperature coefficients of electrical resistance and further may be so proportioned that within certain ranges of values the low temperature resistance values may be selected as desired. However, there are certain improvements in the device structure and characteristics which would be desirable. These are: electrical resistance modification control, fast thermal response, and an improvement over the conventional electrical lead attachment.

The object of the present invention is to provide a positive temperature coefficient bead thermistor comprising two substantially parallel, spaced, electrically and thermally conductive members and a sintered slurry of a positive temperature coefficient thermistor material disposed between the members and at one end thereof, the applied material of the thermistor having been initially oxidized, and thereafter reduced to produce a desired resistance versus temperature characteristic.

Other objects of the invention will, in part, be obvious and will, in part, appear hereinafter.

In order to more fully understand the nature and scope of the invention, reference should be had to the following detailed description and drawings, in which:

FIG. 1 is a plan view illustrating a means for producing a plurality of bead thermistors;

FIG. 2A is a plan view illustrating a means of severing the electrical conductors to produce individual bead thermistors;

FIG. 2B is a plan view illustrating an alternative means of severing the electrical conductor to produce individual bead thermistors; and, FIG. 3 is a graph illustrating various resistance versus temperature characteristics for a bead thermistor.

In accordance with the present invention and in attainment of the foregoing objects, there is provided a process for producing a positive temperature coefficient bead thermistor. A slurry is prepared of any suitable positive temperature coefficient thermistor material. However, it is preferred that the material be a barium titanate, a barium strontium titanate, a barium lead titanate, a barium zirconium titanate or a barium zirconium titanate with lead oxide intimately admixed therein, each of the materials being doped with either yttrium or cerium. Other rare earths such as gadolinium, samarium, or lanthanum may be present. The material is then daubed on two relatively thin, spaced, substantially parallel electrically and thermally conductive members in tension, the material having enough green strength to adhere thereto. The material is sintered at a temperature of 1000° C. or higher depending on the thermistor material employed. The sintered bead is finally alternately reduced and oxidized by a suitable flame, such as, matches, candles or gas burners, until the desired resistance versus temperature characteristic is obtained.

Referring to FIG. 1, there is shown a suitable arrangement 10 for preparing positive temperature coefficient bead thermistors. A plurality of pairs of electrically and thermally conductive members 12 and 14 may be disposed on a frame 16 comprising a refractory metal or ceramic. The members 12 and 14 are attached to the frame so that they are held in tension. Suitable members may be wire about 0.003 inch in diameter. Preferably each pair of members 12 and 14 is spaced from .003 to .009 inch apart for fine bead thermistors. A slurry of the thermistor material is prepared by taking a weighed amount of the normally presintered thermistor material and adding deionized water and a few drops of a thickening agent until the slurry is viscous enough to pick up on a wire probe. The material is then daubed in beads 18 on the spaced parallel members 12 and 14 at selected intervals so as to contact and coat the wires on either side thereof. The complete assembly 10 may then be fired or sintered at a temperature of about 1000° C. or higher in a protective neutral or slightly oxidizing atmosphere for a period of about one or more hours. The bead thermistors are separated after cooling by cutting the members 12 and 14 to appropriate lengths parallel to each other as is shown in FIG. 2A or they may be cut in lengths extending opposite in direction from the bead as is shown in FIG. 2B. Thereafter, the beads are further subjected to additional oxidation and thereafter reduced in a gas flame or the like.

It should be understood that the frame employed in FIG. 1 is only exemplary and that it may assume any suitable shape, such as, a U-shaped plate.

The following examples are illustrative of the teachings of the invention.

*Example I*

A slurry of a thermistor material was prepared by weighing 100 grams of a barium zirconium titanate material in a suitable container, deionized water was added and a few drops of 10% ammonium nitrate solution was added until the slurry was thick enough to pick up on a wire probe. The material was daubed on two parallel platinum wires (.003 inch diameter) spaced about .002 inch apart and wound on a stabilized zirconium oxide U-shaped plate. The member was sintered at 1380° C. for 1 to 2 hours in an argon atmosphere. The bead thermistors were cooled and separated by cutting the lead wires to appropriate lengths parallel to each other. The thermistors were then oxidized at 1260° C. for 20 to 30 minutes in an electric muffle furnace and then reduced in order to attain a desired room temperature and peak resistance at a given temperature as is indicated by the resistance temperature curves of FIG. 3.

*Example II*

A bead thermistor was prepared from a material batch of barium zirconium titanate ready to press (with organic binder addition) by weighing 100 grams of material in a suitable container and adding enough amyl acetate until the slurry was thick enough to pick up on a wire probe. The material was daubed on two parallel platinum wires, spaced .004 inch apart and stretched over a frame as is shown in FIG. 1. After the beads were air dried, the wires were removed from the frame and inserted into an electric muffle furnace on a suitable refractory plate and sintered in argon at 1400° C. for one hour.

In order to obtain a specified electrical resistance, the bead thermistors after separation are oxidized as in Example I, and then reduced to a selected degree to obtain the desired resistance versus temperature characteristic. As is illustrated in FIG. 3, the degree of reduction markedly affects the resistivity. The maximum reduction in a gas flame is shown in curve 1 while curve 2 is less and curve 3 is derived from material only very slightly reduced.

The wires 12 and 14 may be thin flat strips as well as of any desired cross-sectional area. Nickel, or a noble metal capable of withstanding the temperatures of sintering may be employed. Platinum group metals and their alloys are particularly satisfactory.

It is intended that the foregoing description and drawings be interpreted as illustrative and not in limitation of the invention.

I claim as my invention:

1. In the process for producing a positive temperature coefficient bead thermistor, the steps comprising preparing a slurry of a positive temperature coefficient thermistor material, daubing a bead of the material on at least two spaced, relatively thin, substantially parallel, electrically and thermally conductive members to interconnect them, sintering the bead of material in a neutral or slightly oxidizing atmosphere at a temperature of at least 1000° C. and thereafter oxidizing the bead and subsequently reducing the sintered bead to obtain a desired resistance versus temperature characteristic.

2. The process of claim 1, wherein the thermistor material is a barium titanate doped with a rare earth material.

3. The process of claim 1, wherein the thermistor material is a barium strontium titanate doped with one of the group consisting of yttrium and cerium.

4. The process of claim 1, wherein the thermistor material is a barium lead titanate doped with one of the group consisting of yttrium and cerium.

5. The process of claim 1, wherein the thermistor material is a barium zirconium titanate doped with one of the group consisting of yttrium and cerium.

6. The process of claim 1, wherein the thermistor material is a barium zirconium titanate doped with one of the group consisting of yttrium and cerium and having lead oxide intimately admixed therein.

7. In the process for producing a positive temperature coefficient bead thermistor, the steps comprising preparing a slurry of a positive temperature coefficient thermistor material, daubing a bead of the material on at least two relatively thin, substantially parallel, electrically and thermally conductive members spaced from .003 to .009 inch apart, sintering the material in an atmosphere ranging from neutral to slightly oxidizing atmosphere at a temperature of least 1000° C. and thereafter reducing the sintered body to obtain a desired resistance versus temperature characteristic.

8. In the process for producing a positive temperature coefficient bead thermistor, the steps comprising preparing a slurry material comprising barium zirconium titanate, deionized water and 10% ammonium nitrate solution, daubing a bead of the slurry material on at least two spaced, relatively thin, substantially parallel, electrically and thermally conductive members to interconnect them, sintering the bead of slurry material in an argon atmosphere at a temperature of 1380° C. for from one to two hours, oxidizing the sintered bead material at 1260° C. for twenty to thirty minutes and subsequently reducing the sintered bead to obtain a desired resistance versus temperautre characteristic.

9. In the process for producing a positive temperature coefficient bead thermistor, the steps comprising preparing a slurry material comprising barium zirconium titanate, an organic binder addition and amyl acetate, daubing a bead of the slurry material on at least two spaced, relatively thin, substantially parallel, electrically and thermally conductive members to interconnect them, air drying the bead of slurry material, sintering the bead of slurry material in an argon atmosphere at a temperature of 1400° C. for one hour, oxidizing the sintered bead of slurry material and subsequently reducing he sintered bead of slurry material to obtain a desired resistance versus temperature characteristic.

References Cited by the Examiner
UNITED STATES PATENTS

| | | | |
|---|---|---|---|
| 2,373,160 | 4/45 | Bollman et al. | 338—22 |
| 2,495,867 | 1/50 | Peters | 18—47.5 |
| 2,505,066 | 4/60 | Rulison | 338—22 |
| 2,596,285 | 5/52 | Peters | 18—47.5 |
| 2,664,486 | 12/53 | Colpitts | 29—155.63 |
| 2,976,505 | 3/61 | Ichikawa | 338—22 |
| 2,978,661 | 4/61 | Miller et al. | 338—22 |
| 3,044,968 | 7/62 | Ichikawa | 338—22 |

WHITMORE A. WILTZ, *Primary Examiner.*

RAY K. WINDHAM, JOHN F. CAMPBELL,
*Examiners.*